(12) United States Patent
Lim

(10) Patent No.: US 7,063,334 B2
(45) Date of Patent: Jun. 20, 2006

(54) VEHICLE STABILITY SYSTEM USING ACTIVE TILTING MECHANISM

(76) Inventor: Howard Tak Su Lim, 12210 Rives Ave., Downey, CA (US) 90242

( * ) Notice: Subject to any disclaimer, the term of this patent is extended or adjusted under 35 U.S.C. 154(b) by 304 days.

(21) Appl. No.: 10/120,586

(22) Filed: Apr. 11, 2002

(65) Prior Publication Data

US 2002/0109310 A1    Aug. 15, 2002

Related U.S. Application Data

(63) Continuation-in-part of application No. 09/717,688, filed on Nov. 22, 2000, now abandoned.

(51) Int. Cl.
  *B60G 21/045*   (2006.01)
(52) U.S. Cl. .................. 280/5.506; 280/5.508
(58) Field of Classification Search ............ 280/5.502, 280/5.51, 5.508, 124.103, 124.106, 124.107, 280/755, 5.506, 5.507, 6.15, 6.154, 14.106
  See application file for complete search history.

(56) References Cited

U.S. PATENT DOCUMENTS

| | | | |
|---|---|---|---|
| 4,693,493 A * | 9/1987 | Ikemoto et al. ............ 280/5.51 |
| 4,867,466 A | 9/1989 | Soltis |
| 4,882,693 A | 11/1989 | Yopp |
| 4,898,431 A * | 2/1990 | Karnopp et al. ............ 303/146 |
| 4,975,849 A * | 12/1990 | Ema ............ 701/37 |
| 4,993,744 A * | 2/1991 | Hiromoto et al. .......... 280/5.51 |
| 5,015,009 A * | 5/1991 | Ohyama et al. ............ 280/5.52 |
| 5,297,646 A | 3/1994 | Yamamura et al. |
| 5,364,122 A | 11/1994 | Ichimaru |
| 5,376,868 A | 12/1994 | Toyoda et al. |
| 5,559,701 A | 9/1996 | Shimizu et al. |
| 5,742,917 A | 4/1998 | Matsuno |
| 5,772,224 A * | 6/1998 | Tong ........................ 280/5.509 |
| 5,845,918 A * | 12/1998 | Grinde et al. ............ 280/124.1 |
| 5,869,943 A * | 2/1999 | Nakashima et al. ........ 318/586 |
| 5,884,724 A * | 3/1999 | Bohner et al. .............. 180/402 |
| 5,911,768 A | 6/1999 | Sasaki |
| 5,983,154 A | 11/1999 | Morisawa |
| 6,026,920 A * | 2/2000 | Obeda et al. .................. 180/41 |
| 6,070,118 A | 5/2000 | Ohta et al. |
| 6,070,681 A | 6/2000 | Catanzarite et al. |
| 6,199,001 B1 | 3/2001 | Ohta et al. |
| 6,229,263 B1 | 5/2001 | Izawa |
| 6,332,104 B1 * | 12/2001 | Brown et al. .................. 701/1 |
| 6,435,522 B1 * | 8/2002 | Van Den Brink et al. ........................ 280/5.509 |
| 6,505,108 B1 * | 1/2003 | Bodie et al. .................. 701/41 |
| 6,556,908 B1 * | 4/2003 | Lu et al. ....................... 701/38 |
| 6,598,891 B1 * | 7/2003 | Sakai .................. 280/124.161 |
| 6,834,218 B1 * | 12/2004 | Meyers et al. ................. 701/1 |

* cited by examiner

*Primary Examiner*—Ruth Ilan
*Assistant Examiner*—Toan C. To

(57) ABSTRACT

The present invention is a vehicle stability system that affords safe turn with higher speed as well as maximum brake performance and resists rollover by using one or more electrical and mechanical modes to shift the center of gravity of the vehicle into a more stable position in the event of a turn condition. A preferred embodiment of the present invention utilizes an active tilt control to tilt the vehicle in the opposite direction to the vehicle's natural inclination to tilt. A second preferred embodiment utilizes a shifting weight, that is a ballast or any heavy part of the vehicle to move the center of gravity toward to side of the vehicle tending to lift up during a tilt condition. The first and second preferred embodiments can be used alone or in combination to create a more dynamic stable condition for the vehicle in turn mode.

11 Claims, 11 Drawing Sheets

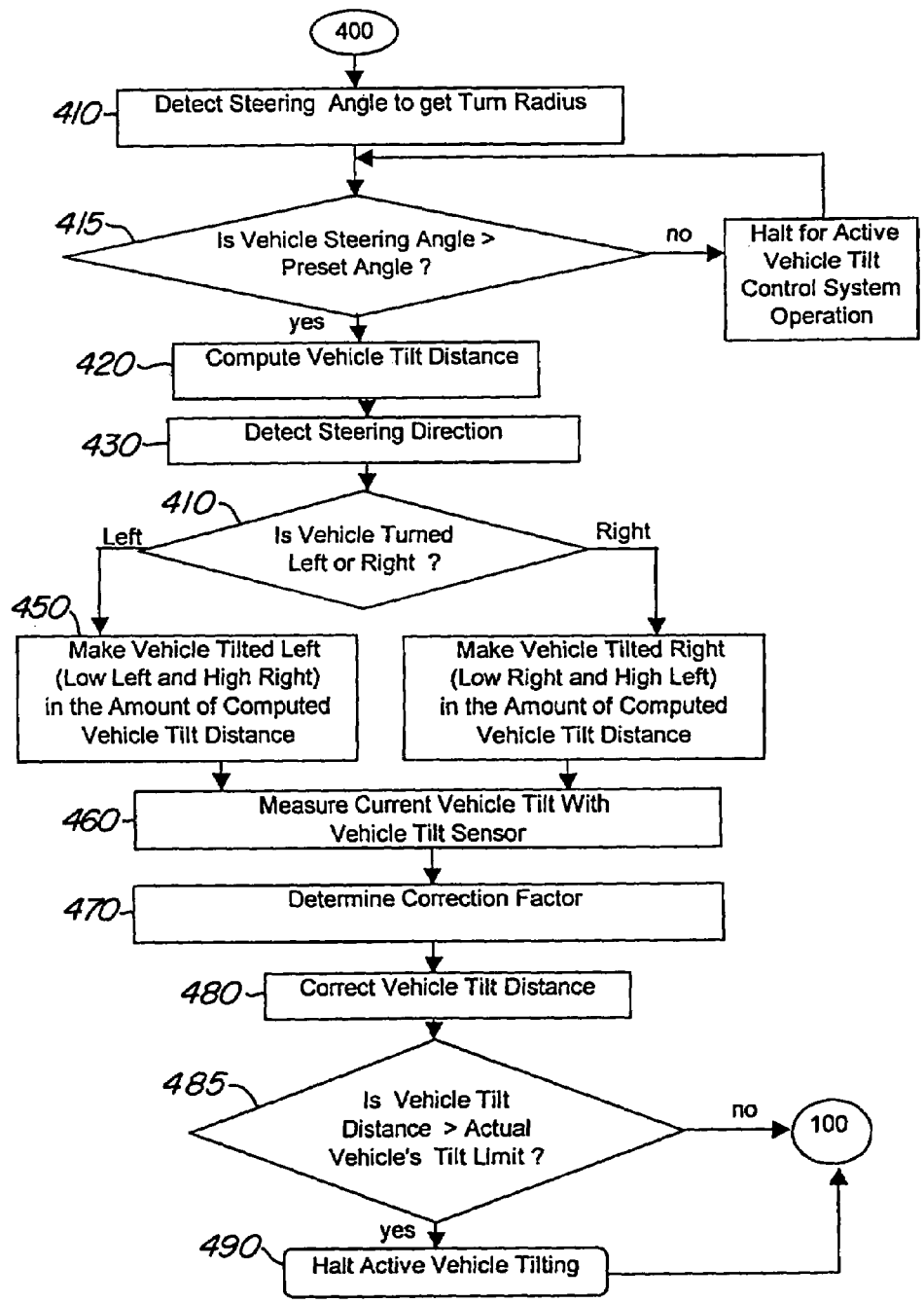

VEHICLE STABILITY SYSTEM USING ACTIVE TILTING MECHANISM

RELATED APPLICATIONS

This application is a continuation-in-part application of U.S. patent application Ser. No. 09/717,688, filed Nov. 22, 2000, now abandoned, which is fully incorporated by reference herein.

BACKGROUND OF THE INVENTION

1. Field of the Invention

The present invention is directed generally to vehicle stability systems, and more particularly to a vehicle stability system using an active tilting mechanism to compensate for the natural tendency of a vehicle to tilt during a turning maneuver thereby enhancing safety and providing a more comfortable driving condition. It affords a safer severe turn with higher speed as well as improved brake performance and reduces the possibility of the vehicle rolling over.

2. Description of Related Art

There are a number of factors that affect the stability or instability of a vehicle in motion. The present invention focuses on the instability that may cause a vehicle to tilt and experience rollover, a condition in which the vehicle tilts and rolls over laterally while turning, creating a perilous situation in extreme circumstances.

Stability is important for safety and for comfortable driving conditions, especially during a turning maneuver. When turning, the driver and passengers in the vehicle are preferably in as stable a state as possible, and not leaning in a direction opposite the turn direction. In addition, the driver should have the optimum visibility available by obtaining a closer view along the turn direction, and not increasing the blind spot with the vehicle tilted away in a direction opposite to the turn direction as seen in conventional vehicles. Moreover, the weight of the vehicle should be as uniformly allocated as possible to each wheel of the vehicle when it is turning. Thus, the total friction between the tires and the road surface can be evenly distributed to all the wheels so that the vehicle can be safely maneuvered and get the maximum performance of the brake system.

A suspension involving all these considerations has not been identified in the field of vehicle stability systems. Vehicle rollover is a condition that seriously injures or kills many people each year in this country. In an attempt to avoid serious injury to the occupants of a car in the event of a rollover, many cars have been equipped with specialized roll bars to protect the integrity of the vehicle cabin when rollover occurs. However, the present inventor is unaware of any attempt in the prior art to prevent the occurrence of a rollover by evaluating in real time the conditions that lead to a rollover, and using counter active measures to compensate for the vehicle's inclination to rollover when evaluated factors predict a rollover condition.

SUMMARY OF THE INVENTION

The present invention is a vehicle stability system that affords a safer severe turn at higher speed as well as optimizing braking performance, and yielding a comfortable and safe driving environment. The stability system resists rollover by using one or more mechanical modes to shift the center of gravity of the vehicle into a more stable position when the vehicle turns. A preferred embodiment of the present invention utilizes an active tilt control to tilt the vehicle a direction opposite to the vehicle's natural inclination. A second preferred embodiment utilizes a shifting weight or ballast to move the center of gravity toward the side of the vehicle tending to lift up during a turning condition. The first and second preferred embodiments can be used alone or in combination to create a more stable condition for the vehicle.

The present invention relies on various inputs from sensors positioned throughout the vehicle to interpret conditions such as vehicle speed, turning radius and vehicle weight. These conditions are relayed to a central processing unit that converts the inputs into a vehicle tilt calculation. When the vehicle tilt calculation computes that the vehicle tilt is within reach, the active tilting mechanism initiates a countermeasure in the form of a shifting ballast or a vehicle tilt that stabilizes the vehicle to achieve dynamic stability and minimizes the potential for vehicle rollover.

The active tilting mechanism of the first preferred embodiment lifts the side of the vehicle furthest from the center of the turning radius of the car to create an artificial bank in the vehicle's orientation. Banking a track is a well-known tool used to stabilize a vehicle turning at a high rate of speed, such as those found on racetracks. Instead of having a laterally inclined road to turn on, however, the present invention utilizes this concept by raising the appropriate side of the vehicle to maintain the stability of the vehicle during the turning operation.

The tilting mechanism is controlled by a central processing unit and is preferably mounted to the chassis of the vehicle. For example, a hydraulic system with a motor controlled by the central processing unit can be employed to raise and lower one side of the vehicle on command. By strategically placing hydraulic units at, for example, the location of the wheel mounts, working in unison the hydraulic units can lift the entire side of a vehicle upon a command from the central processing unit as will be explained in more detail below. The command from the central processing unit (also referred to as the active tilt control processing unit) is based upon various real time conditions of the vehicle such as velocity, weight, external environmental conditions, and turning radius.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

Figure 1:
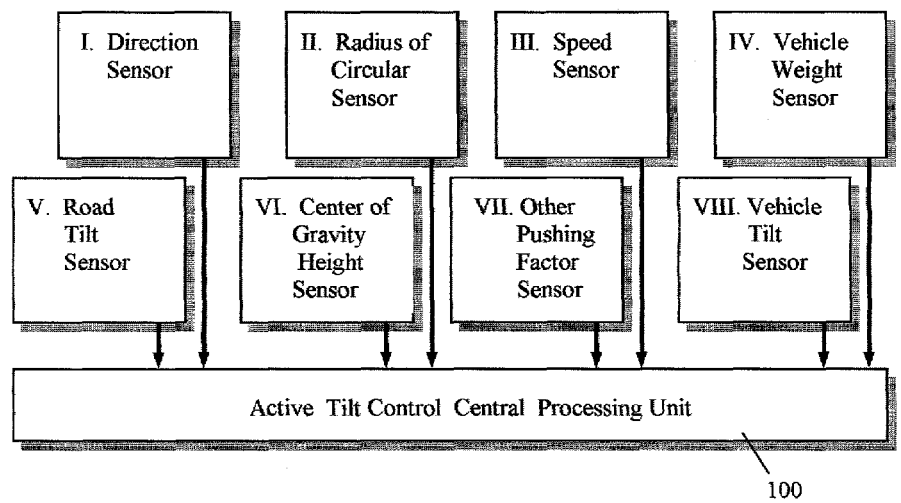
FIG. 1 is a schematic of the various inputs to the active tilt control central processing unit.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a vehicle stability system that affords comfortable driving environment as well as maximum brake performance and resists vehicle rollover using an active tilting mechanism.

Before the present invention is described it may be helpful to discuss some of the factors that influence the vehicle's stability with respect to the tilt condition. The first concept is that of a center of gravity. Each vehicle has a center of gravity, a point at which, from a physics stand point, the vehicle can be treated as a single point upon which all forces are attributed to. Using elements of statics and dynamics, the motion of the vehicle can be characterized by the application of the forces and torques at the center of gravity. The location of the center of gravity plays a critical role in the stability of the vehicle.

A main force on the vehicle is the weight of the vehicle, which typically passes through the center of gravity towards the center of the earth. With respect to the tilt condition, in many cases the vehicle's weight provides a restoring force that returns stability to the vehicle if the vehicle begins to tilt due to a preliminary tilt condition. However, if a certain orientation is achieved the weight of the vehicle will cease to be a restoring force and will become a promoting force that causes the vehicle to roll over. Accordingly, in order to control and resist dynamic natural tilt conditioning it is important to be aware of the changing force of the weight with respect to the center of gravity of the vehicle and, if necessary, to manipulate it accordingly.

Another important condition is the speed of the vehicle, or more properly the velocity of the vehicle. For certain purposes it may be assumed that the forces acting on the entire vehicle is concentrated on the center of gravity, and that the center of gravity is moving with a velocity vector V. As long as the velocity vector V is linear then there is little opportunity for a tilt condition in absence of some outside environmental factors such as heavy winds. This condition will be dealt with later. However, when the vector V follows a curvilinear path then the vehicle experiences a phenomenon known has centrifugal force. The direction of the centrifugal force is perpendicular to the velocity vector V in the direction away from the center of curvature of the velocity vector V. The centrifugal force is proportional to the square of the magnitude of the velocity vector V and inversely proportional to the turning radius of the velocity vector V.

$$F \sim V^2/R$$

That is, a vehicle that is traveling at 20 miles per hour will experience ¼ the centrifugal force of a vehicle traveling 40 miles per hour, all other conditions being the same. Similarly, a vehicle experiencing a turning radius of 50 feet will experience twice the centrifugal force of a vehicle experiencing a turning radius of 100 feet. It is this centrifugal force that, if unchecked and if of a sufficient magnitude, will cause the vehicle to tilt, called "natural tilt," and overturn at high speed. The amount of natural tilt force T is determined by this centrifugal force C and the vehicle weight gravity force W according to the equation:

$$T \sim \text{SQUARE ROOT}(C^2+W^2)$$

The natural tilt angle A is determined by the tilt force T and the weight force W according to the equation:

$$A \sim \text{COSINE}^{-1}(W/T),$$

and the direction of the natural tilt force T is determined by the natural tilt angle A.

The natural tilt force distributes the vehicle weight force unevenly on the wheels. It places more vehicle weight force on the wheels on the outside of the turn, causing vehicle control failure and reducing brake performance.

The counter measure to this natural tilt, called "active tilt," dynamically places the natural tilt force in the direction of the vehicle weight gravity force, thereby reducing the lateral force acting on the vehicle in a turn. An active tilting mechanism is used to equally distribute the total amount of the vehicle weight gravity force on all of the wheels and thereby maintain a stable state, achieving a comfortable driving maneuver as well as maximum brake performance in the turn. The active tilting mechanism lowers the inside of the vehicle in the turn, allowing better driving visibility in the turn.

This phenomenon can best be explained by way of an example, such as that of a motorcycle rider or bicyclist. While riding along a straight path, the center of gravity of the motorcycle rider is approximately between the front and the rear wheels along the line that joins the point of contact between the two wheels. The weight of the vehicle acts upon the center of gravity directly downward and the motorcycle rider will typically refrain from leaning to the left or right to enjoy the stability that the weight of the motorcycle provides. However, as the motorcycle rider initiates a turn he will experience a gradually increasing lateral force tending to tilt the motorcycle in a direction away from the center of his turning radius. As he accelerates the force will become more and more pronounced and if unchecked will cause the motorcycle rider to experience a rollover.

Moreover, as the turn becomes sharper and sharper the turning radius becomes smaller and smaller further amplifying this affect. However, experienced motorcycle riders know how to combat this affect by tilting their vehicle into the turn. This is done by shifting the weight of the rider such that the center of gravity of the motorcycle with the rider is no longer above the wheels but is in fact displace laterally in the direction of turn. This creates a torque on the vehicle between the vehicle's point of contact with the road, i.e. the tires, and the center of gravity of the vehicle. The amount of torque produced by the rider using this leaning technique should exactly balance the torque produced from the centrifugal force on the motorcycle's center of gravity, to achieve dynamic stability. If the opposing torques are of equal magnitude and in opposite directions they will cancel out and the vehicle will remain stable. If either torque is significantly greater than the other, then the vehicle will become unstable and will either fall or rollover. This technique allows motorcycle riders and bicyclists to avoid the rollover scenario, accomplishing dynamic stability by placing static instability on the motorcycle for a turn.

A vehicle such as an automobile will undergo the same type of forces as those just described with respect to the motorcycle. That is, a vehicle such as an automobile will have a weight factor passing through the center of gravity directly downward and during a turn will have a natural tilt force vector in the lateral or rollover direction. However, the traditional configuration of an automobile, due to its axels attached across the vehicle, does not allow for the driver to offset the torque generated by the natural tilt force by shifting the weight of the vehicle via the center of gravity. While an automobile is significantly more stable in the lateral direction than a bicycle or motorcycle, if the torque generated by the natural tilt force is great enough it will cause the vehicle to tilt and rollover.

The situation with a four-wheel vehicle can be exacerbated by the presence of a shock absorbing system. When such a vehicle is in the process of a turn it will experience the natural tilt force as determined by the weight gravity force of the vehicle and the centrifugal force of the turn. This will produce a torque on the vehicle through the center of gravity which will tend to increase the force on the outside wheels while decreasing the force on the inside wheels. A shock absorbing system will tend to collapse slightly upon the increase in weight and rise upon the decrease in weight creating a secondary tilting condition. The secondary tilting condition contributes to the inclination of the vehicle to tilt and actually facilitates the rollover condition in extreme circumstances.

The purpose of the present invention is to overcome both the secondary tilt, if a suspension system is in place, as well as the primary tilting condition caused by the natural tilt force, by generating a banked condition which shifts the center of gravity into a more stable position. For purposes of clarification herein when a vehicle is making a counter clockwise turn the left side of the vehicle will be referred to as the inner portion and the right side of the vehicle will be referred to as the outer portion. Conversely, when making a clockwise turn the right side of the vehicle becomes the inner portion and the left side becomes the outer portion. This convention will be used through out the description of the invention.

A preferred embodiment of the present invention includes a central processing unit 100 that receives a number of inputs from various sensors and determines a vehicle tilting coefficient based upon the forces acting on the vehicle. When a vehicle specific tilting coefficient reaches a value that is set to tilt condition, the system implements a tilting mechanism to create an artificial bank that opposes the tendency to natural tilt. The tilting mechanism lifts the outside of the vehicle to counteract the torque generated by the centrifugal force, and dynamically places the vehicle in a stable condition. The specifics of a preferred embodiment of the present invention will be discussed below for illustrative purposes.

In order to offset the torque generated by the centrifugal force the vehicle stability system of the present invention must be able to determine (1) which side of the vehicle to tilt and (2) how much tilt should be applied to the vehicle. In order to make this evaluation as many as eight different inputs of various conditions are relayed to the central processing unit for evaluation. Each one of these conditions will be discussed in turn below.

The first condition to be evaluated is the turning direction 11 of a vehicle in a turning maneuver. Once the direction (left or right) of the turn has been established the first question posed above, i.e. which side of the vehicle may need to be tilted is answered. As discussed above a left-hand turn will cause the right portion of the vehicle to be raised while a right-hand turn will cause the left portion of the vehicle to be raised. This determination can be made in one of several different ways. For example, a sensor can be linked to the steering wheel or the front tires that will give an indication based on a deviation from a reference position whether the vehicle is turning to the left or to the right. Other more sophisticated sensors can be used such as accelerometers or GPS navigating sensors to evaluate the instantaneous motion of the vehicle. Any one of these options will allow the central processing unit 100 to evaluate the preliminary question of which direction (left or right) the vehicle is turning.

The second condition to be evaluated is the severity of the turn 13, measured by the turning radius of the turn. A small turning radius creates a higher centrifugal force and requires a greater offset in the tilt to maintain stability. The turning radius can be evaluated again by linking a sensor to the steering wheel system or by measuring the angular deviation of the wheels from a linear path. Or, again, more sophisticated sensors such a GPS sensor or an accelerometer can be used to measure the exact instantaneous direction of the vehicle which can be converted into a turning radius. This input is relayed to the central processing unit to evaluate the magnitude of the projected centrifugal force.

The next two factors to be evaluated in the tilt control mechanism are the instantaneous speed of the vehicle 15 and the weight of the vehicle 17. The instantaneous speed of the vehicle is a critical factor in the magnitude of the centripetal acceleration and corresponding centrifugal force of the vehicle. As has been stated the resultant centrifugal force is a product of the square of the instantaneous velocity. Moreover, the weight of the vehicle has a direct impact on the amount of force imparted on the vehicle. The weight of the vehicle, which is always directed downward, can be a restoring force when the vehicle is in a stable mode, or can be a tilting force if the point of criticality between stability and instability is reached. The speed of the vehicle can be input from the speedometer of the vehicle and the weight of the vehicle can be measured from the weight meter installed on the vehicle shocks or estimated from the manufacture provided empty weight of the vehicle plus any cargo and passengers that occupy the vehicle. These inputs are delivered to the central processing unit 100 for further evaluation.

The next factor to be evaluated is the road inclination condition 19. A lateral inclination of the pavement leading to the left-hand side of the vehicle being higher or lower than the right-hand side of the vehicle, presents a natural banked condition that the present invention accounts for. If the bank is positive, i.e. the righthand side of the vehicle is elevated above the left-hand side for a left-hand turn then the amount of tilt adjustment would be reduced accordingly. Conversely, if there is a negative bank situation, i.e. the right-hand side of the vehicle is lower than the left-hand side vehicle for a left-hand turn the road inclination is favoring a tilt condition which must be further accounted for. Liquid field sensors which determine the offset from a horizontal position, can be used in this instance to measure the road inclination and this input can be forwarded to the central processing unit 100 for evaluation.

The next condition to be forwarded to the central processing unit is the evaluation of the center of gravity 21. The location of the center of gravity is a critical factor in understanding a vehicle tilt and predicating the potential for a vehicle rollover. A high center of gravity will produce a much greater tendency to roll the vehicle over during a turn whereas a low center of gravity provides a much more stable situation requiring more extreme conditions in order to have a vehicle rollover. The position of the center of gravity can be mathematically determined from the mass of the individual elements of the vehicle along with the location and mass of the vehicle cargo and passengers. Similar to the road inclination, if the vehicle is heavily loaded to one side or another this condition must be accounted for because the situation can either contribute to or deter from tilt and rollover condition. However, the location of the center of gravity can be ignored if the vehicle natural tilt is aligned with the vehicle weight gravity force, which is the purpose of this invention, because the vehicle does not experience any lateral force.

The next input into the calculation is the external forces input 23. The external forces will primarily consist of environmental contributions such as a crosswind. Depending on the direction, a crosswind can have a critical impact on the possibility of a vehicle tilt. The lateral force in the direction of the tilt is extremely sensitive to the velocity of the wind, and high profile vehicles experience a large amount of lateral force. Accordingly, both the crosswind magnitude as well as the profile of the vehicle are important factors in the evaluation. These factors are input into the central processing unit 100 for evaluation of the vehicle tilt condition.

FIG. 1 illustrates eight inputs 27 from various sensors to the central processing unit. Box I 11 is the direction sensor that indicates the direction of the vehicle's turn. Box II 13 corresponds to the sensor that determines the turning radius, or the severity of the turn experienced by the vehicle. Boxes III 15 and IV 17 are the instantaneous speed of the vehicle and the vehicle's weight, respectively. Box V 19 reflects the road inclination condition and Box VI 21 represents the center of gravity position. Box VII 23 corresponds to the external forces, i.e. the environmental forces on the vehicle such as wind. Box VIII 25 is the current vehicle tilt condition. This condition corresponds to the actual current state of the vehicle's tilt. For example, if the vehicle is experiencing an unwanted tilt (contrasted with a tilt due to road inclination) resulting from a preliminary tilt condition, the amount of current tilt is evaluated and provided to the central processing unit 100 for evaluation and counter measure. Using these eight inputs the counter measures of the present invention can be implemented to afford safe turns as well as maximum performance of the vehicle brake system in a turn and reduce the risk of rollover by maintaining the vehicle's dynamic stability in a turn.

Figure 2:
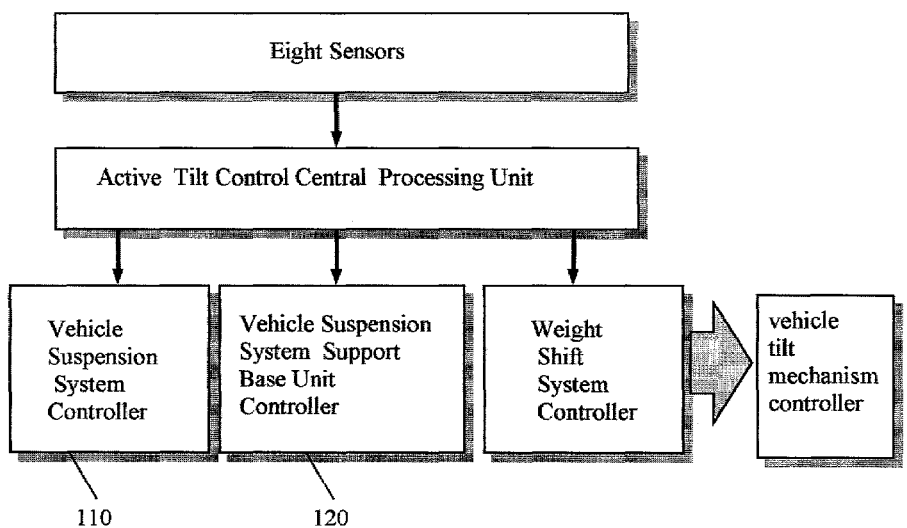
FIG. 2 is a schematic of the relation between the active tilt control central processing unit and the three described tilt control mechanisms.

FIG. 2 is a schematic of the relationship between the output from the central processing unit 100 and the vehicle's stability control mechanisms. A series of tilt control mechanisms to be implemented on the vehicle can be used alone or in combination. The first vehicle tilt control mechanism is the vehicle suspension system controller 110. The vehicle suspension system controller receives the input from the active tilt control central processing unit 100 and generates commands for the vehicle suspension system to tilt the vehicle to counter act a natural tilt condition. Because there are a wide variety of vehicle suspension systems in use, and there are a number of ways to employ each system to tilt the vehicle, the specific vehicle suspension system controller 110 must be selected to be compatible with the existing vehicle suspension system.

Figure 3:
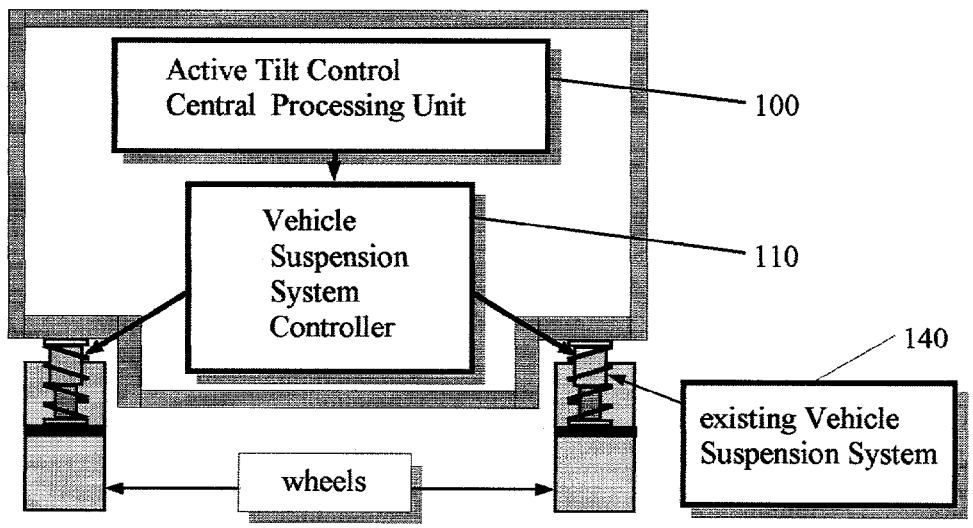
FIG. 3 is a schematic diagram of the vehicle suspension system controller's interrelation with the vehicle's existing suspension system.

FIG. 3 shows a schematic of a relation between the active tilt control central processing unit 100, the vehicle suspension system controller 110, and the relative height of the vehicle at the left and right sides. The vehicle suspension system controller 110 receives the information from the tilt control central processing unit and provides commands to the specific suspension system 140 to raise the left or right hand side of the vehicle accordingly. This will create an artificial banked situation that can be used to counter act the natural tilt of the vehicle in a turn. Here, for example, shock absorbers with a variably-controlled pressure can be used to move the vehicle frame upward and downward in response to a signal from the vehicle suspension system controller 110, thereby creating an artificial bank that can be used to offset a natural tilt.

Figure 4:
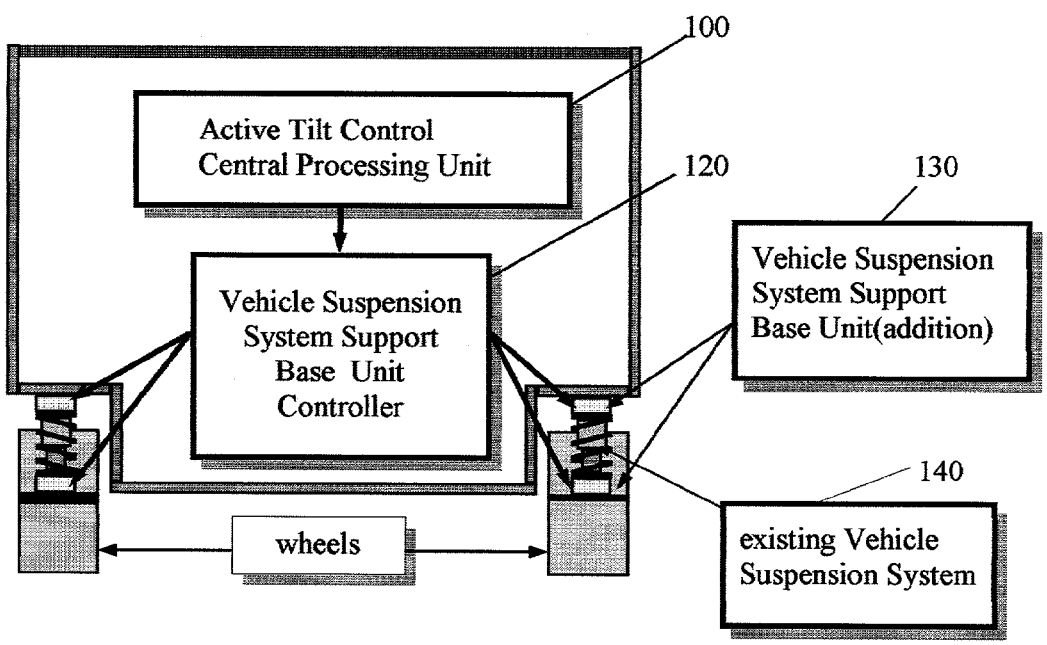
FIG. 4 is a schematic diagram of the vehicle suspension system support base unit controller's interrelationship with the vehicle suspension system support base unit.

The second vehicle tilt control mechanism comprises a secondary or external vehicle suspension system 130 in addition to the primary vehicle suspension system 110 provided with the vehicle. The vehicle suspension system support base unit controller 120 receives the input from the active tilt control central processing unit 100 and provides output commands to the vehicle suspension system support base unit 130 for generating vehicle tilt. Tilt generated from the vehicle suspension system support base unit 130 is cumulative with the tilt generated by the tilt of the vehicle suspension system 140. FIG. 4 shows an illustration of the vehicle suspension system support base unit controller 120 and the vehicle suspension system support base unit 130 in combination with the existing vehicle suspension system 140. By evaluating the vehicle's characteristics and capabilities, an appropriate vehicle suspension system support base unit 130 can be selected to provide an appropriate range of tilt to counteract natural tilt conditions that may be incurred.

Figure 5:
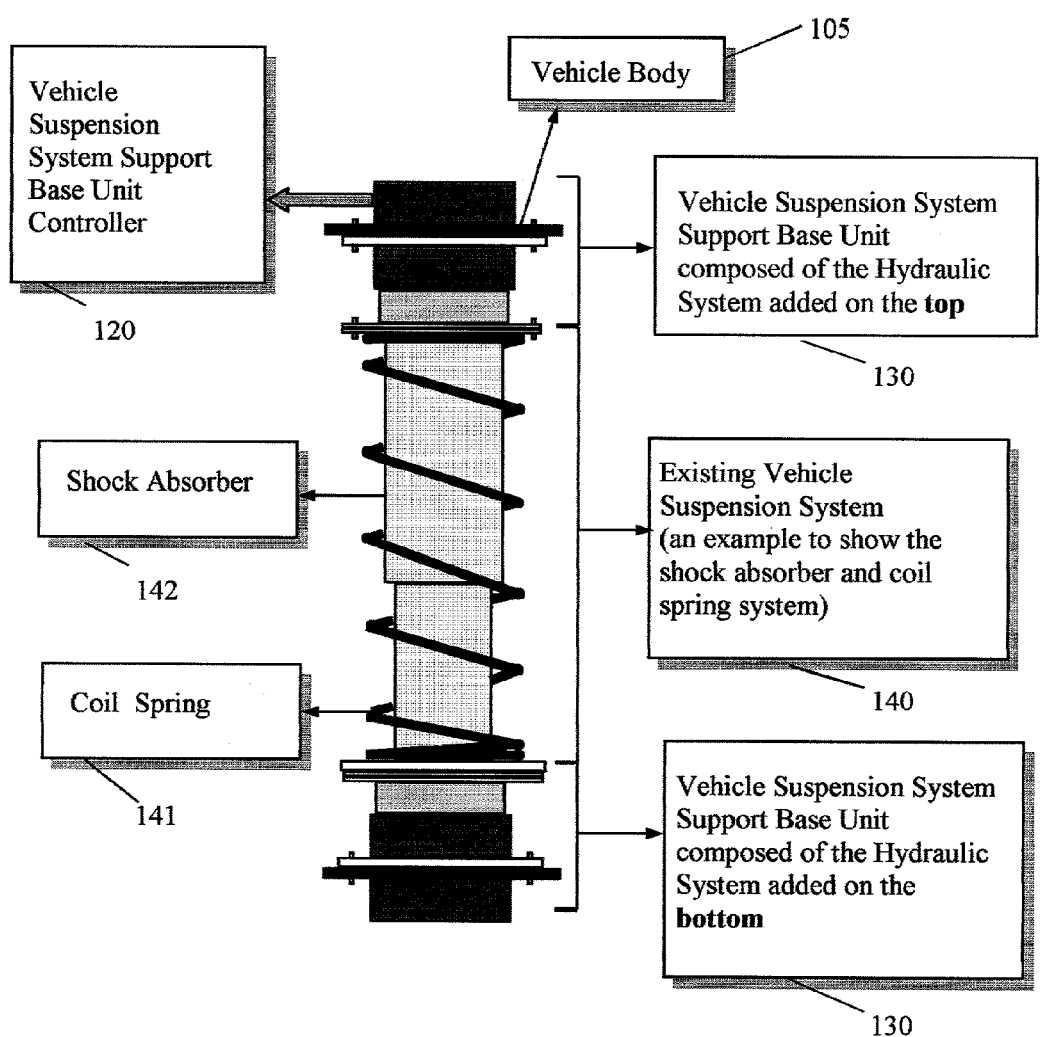
FIG. 5 is a schematic diagram of a vehicle suspension system and a vehicle suspension system support base unit cooperating to raise the vehicle.

FIG. 5 shows a first preferred embodiment of a vehicle suspension system support base unit, namely a hydraulic system. The vehicle suspension system support base unit controller 120 regulates the amount of fluid traveling to the hydraulic system which in turn regulates the height of the vehicle body. The system comprises a coil spring 141 wrapped around a shock absorber 142 which supports and mounts the vehicle body 105. The height of the vehicle body 105 is adjusted by increasing the hydraulic fluid in the shock absorber 142. The coil spring 141 is selected to dampen out the vibration mode of the shock absorber 142. The shock absorber 142 and the coil spring 141 comprise the existing vehicle suspension system 140 whereas the vehicle suspension system support base unit 130 resides on top of the existing vehicle suspension system, as well as potentially below it.

Figure 6:
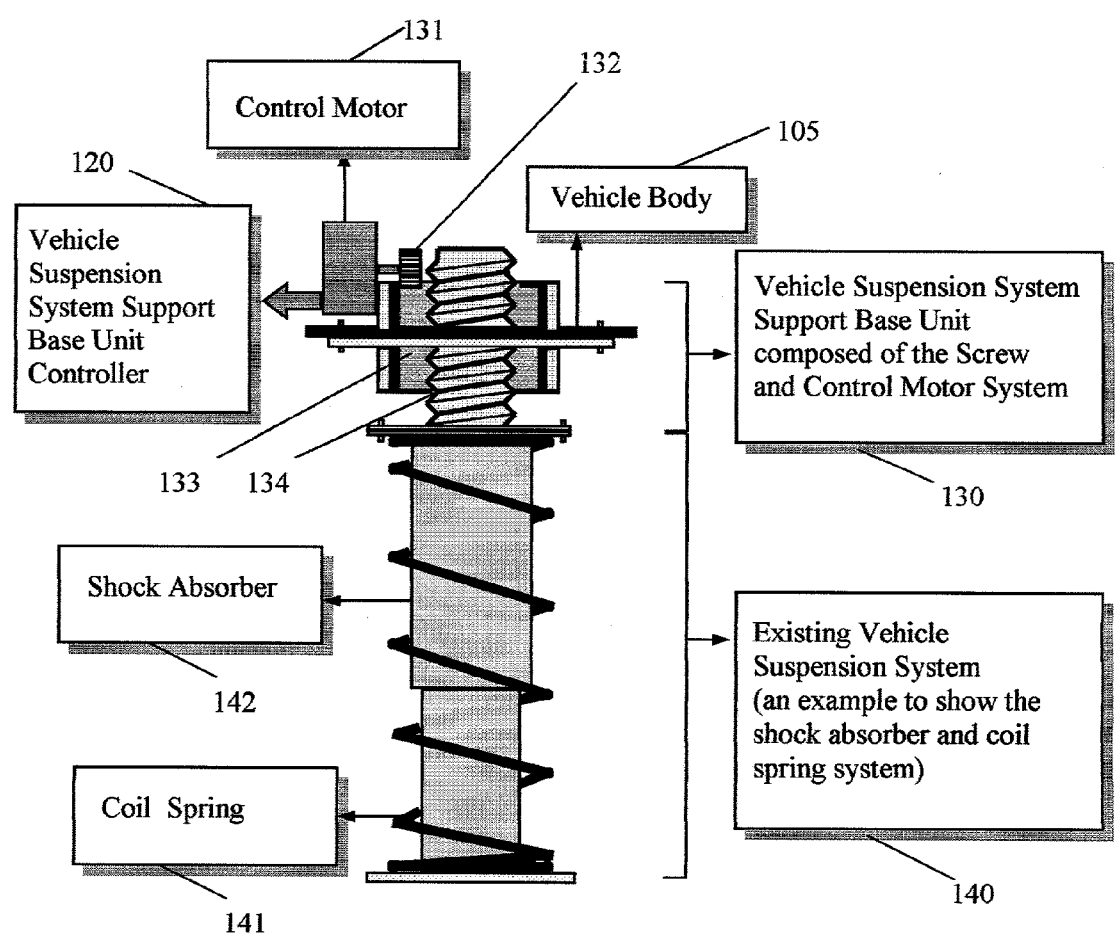
FIG. 6 is a schematic diagram of a vehicle suspension system with an alternate vehicle suspension system support base unit.

A second preferred embodiment of the tilt control mechanism comprises a screw and a motor control system as shown in FIG. 6. Here, again, the existing vehicle suspension system 140 comprising the shock absorber 142 and coil spring 141 are shown to illustrate that the vehicle suspension system support base unit 130 is supplemental and cumulative of the existing vehicle suspension system 140. In this embodiment the vehicle suspension system support unit 130 comprises a motor 131 cooperating with a gear arrangement 132–134 to mechanically raise and lower the vehicle body 105. The gear mechanism 132 connected to the end of the motor 131 drives a second gear 133 connected to the vehicle mounting platform that meshes with a third gear 134 to raise and lower the vehicle body 105 accordingly. In this manner, the control motor 131 can raise and lower the vehicle body 105 in response to commands from the vehicle suspension system support base unit controller. Although two preferred embodiments for raising and lowering the vehicle have been described, it is to be understood that there are numerous other methods for raising and lowering the vehicle in response to commands originating from the active tilt control central processing system unit 100 such as pneumatic controls, electromechanical systems, and alternative known mechanical lifting apparatus.

Figure 7:
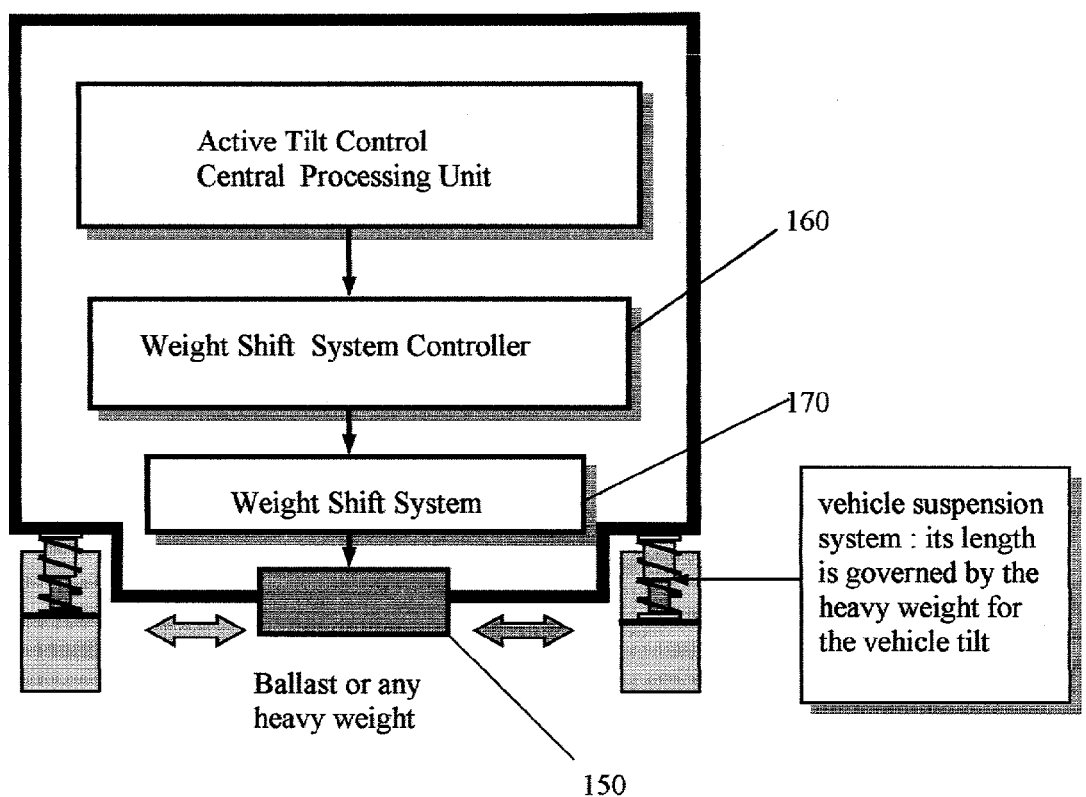
FIG. 7 is a schematic diagram of a ballast or weight shift mechanism.

A third tilt control mechanism for opposing a natural tilt condition is shown in FIG. 7 and comprises a slideable ballast 150 located beneath the vehicle, at any heavy part of the vehicle such as engine or cargo. The ballast under the heavy part of the vehicle comprises a heavy weight that can be transferred laterally as needed to shift the center of gravity of the vehicle and oppose a natural tilt condition. For example, if the vehicle is making a left-hand turn, the active tilt control processing unit 100 would command the weight shift system control 160 to slide the ballast 150 to the left side of the vehicle to resist the tendency of the left-hand portion of the vehicle to tilt upward in a natural tilt condition. When the turn is completed the ballast 150 is returned to a tilt neutral position along the centerline of the vehicle. When used in combination with one of the tilt control mechanisms previously discussed the weight shift controller 160 and ballast 150 provides excellent additional security against a natural tilt condition and rollover in extreme circumstances.

Figure 8:
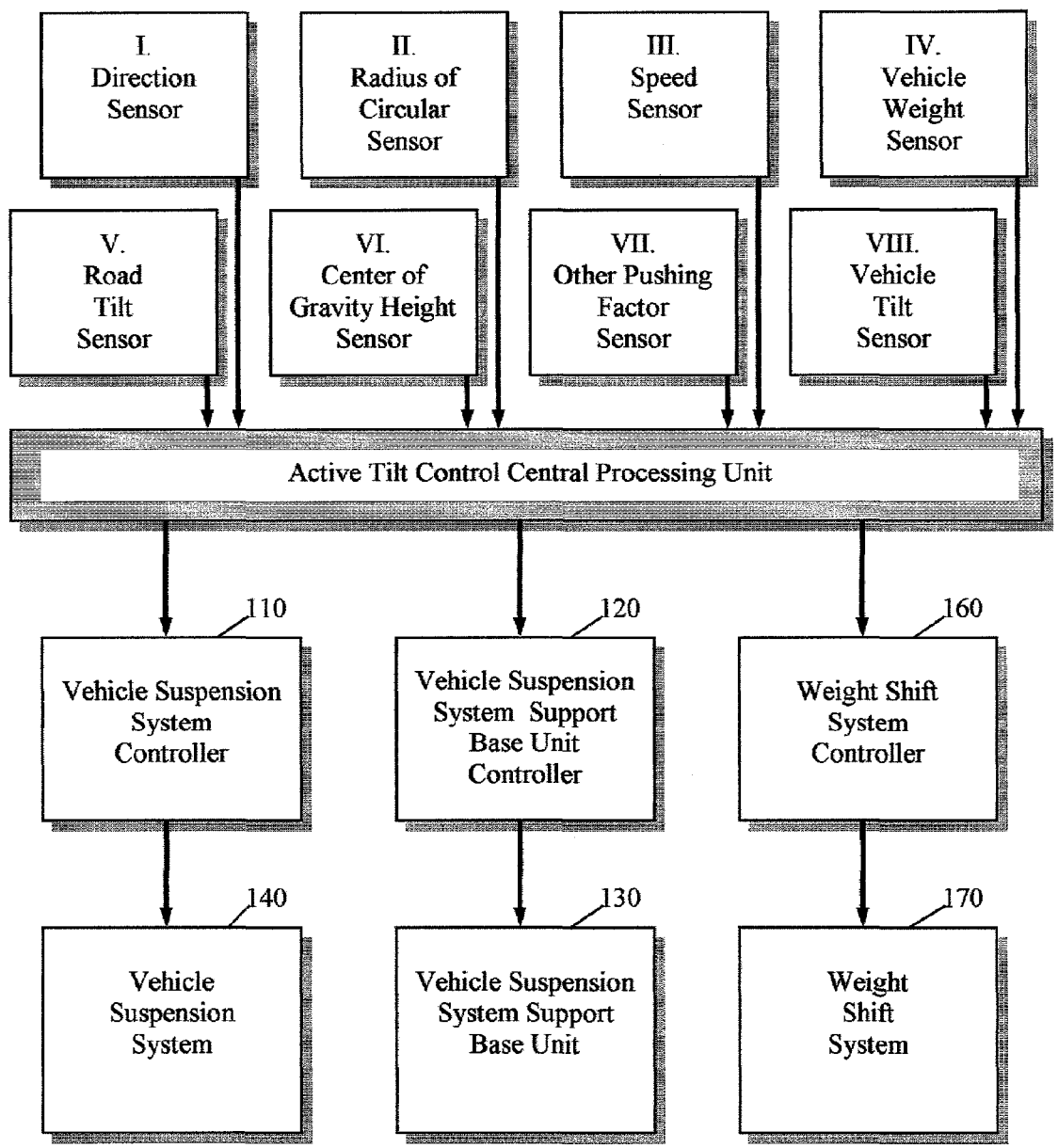
FIG. 8 is a schematic diagram of the various inputs to the active tilt control central processing unit, and the various mechanisms controlled by the active tilt control central processing unit.

FIG. 8 is a composite schematic of the eight inputs 27 from the sensors, the active tilt control central processing unit 100, and the three tilt control mechanisms comprising the vehicle suspension system, the vehicle suspension system support base unit, and the weight shift system.

Figure 9:
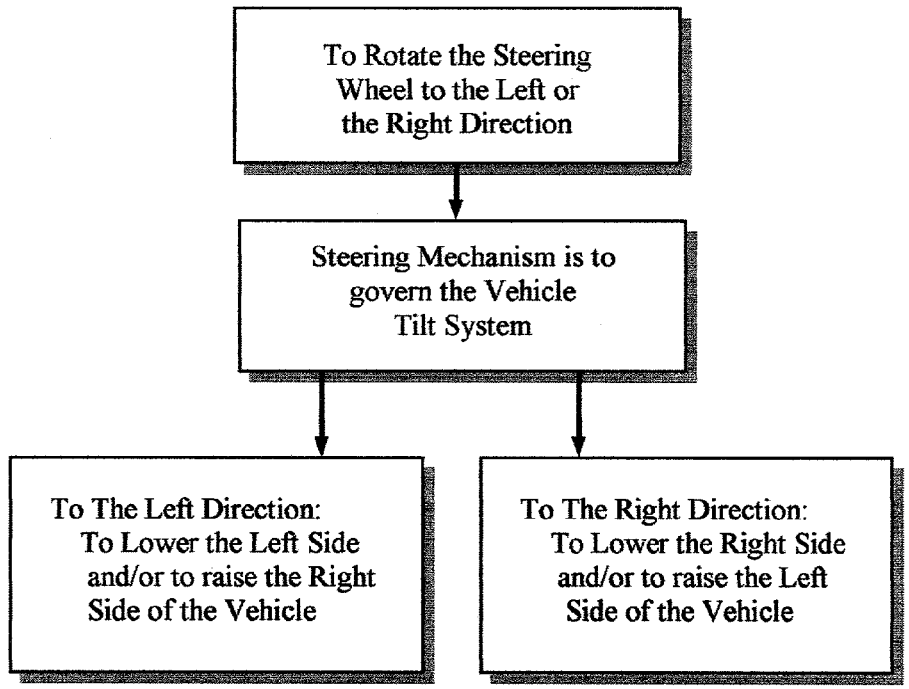
FIG. 9 is a logic diagram for a mechanical tilt control system without an active tilt control processing unit.
Figure 10:
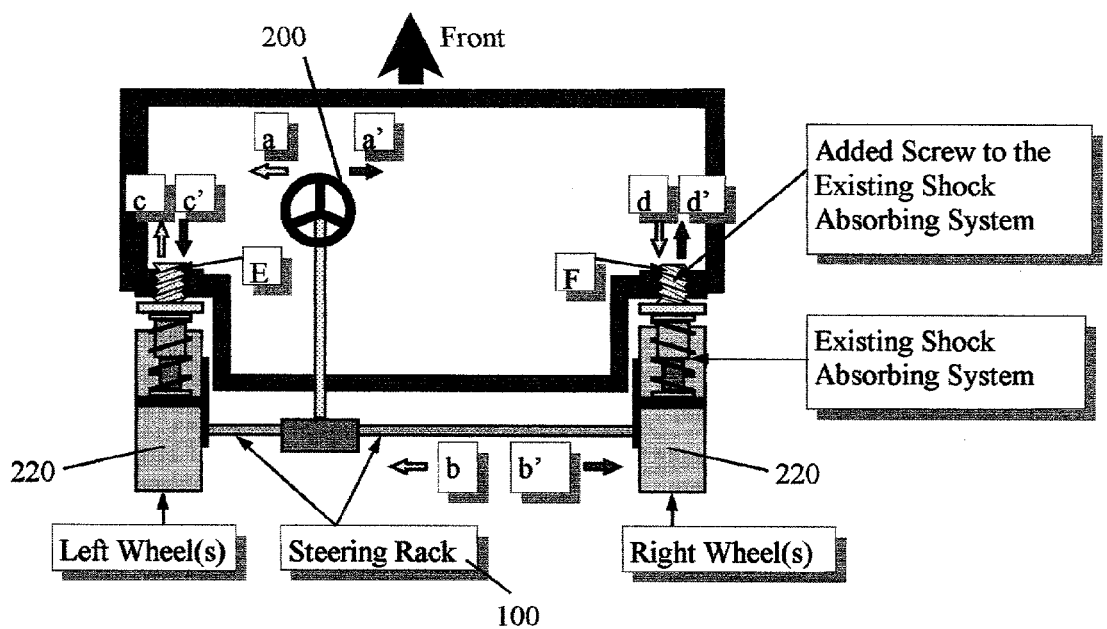
FIG. 10 is a schematic diagram of a mechanical system for implementing the tilt control without a tilt control processing unit.

FIGS. 9 and 10 illustrate an embodiment that is primarily mechanical in nature and eliminates the active tilt control central processing unit from the system. In this embodiment, tilt control is governed by the rotation of the steering wheel 29, 31. When the driver rotates the steering wheel to the left 33, the vehicle's tilt control system linked to the vehicle's steering mechanism lowers the left-hand side of the vehicle and/or raises the right-hand side of the vehicle to generate the appropriate amount of vehicle tilt. In the same way, as the driver rotates the steering wheel to the right 35 the vehicle tilt mechanism which is linked to the vehicle steering mechanism lowers the right-hand side of the vehicle and/or raises the left-hand side of the vehicle to produce the appropriate bank for the turn. The greater the rotation of the steering wheel the higher the degree of offset vertically between the left and right hand side of the vehicle. Such a system is particularly shown in FIG. 10 as a example. When the steering wheel 200 is rotated counter clockwise the steering rack 210 turns the wheels 220 to the left. Geared mechanisms E and F cooperate to lower the left wheel with the shock absorbing system and raise the right wheel with the shock absorbing system respectively. When the driver turns the wheel in the clockwise directions the screw mechanism E and F operate in the opposite direction to raise and lower the right and left hand side of the vehicle respectively. The screw mechanisms E and F reside between the chassis of the vehicle and the existing shock absorbing system, and cooperate to orient the vehicle against a natural tilt and rollover conditions.

Figure 11A:
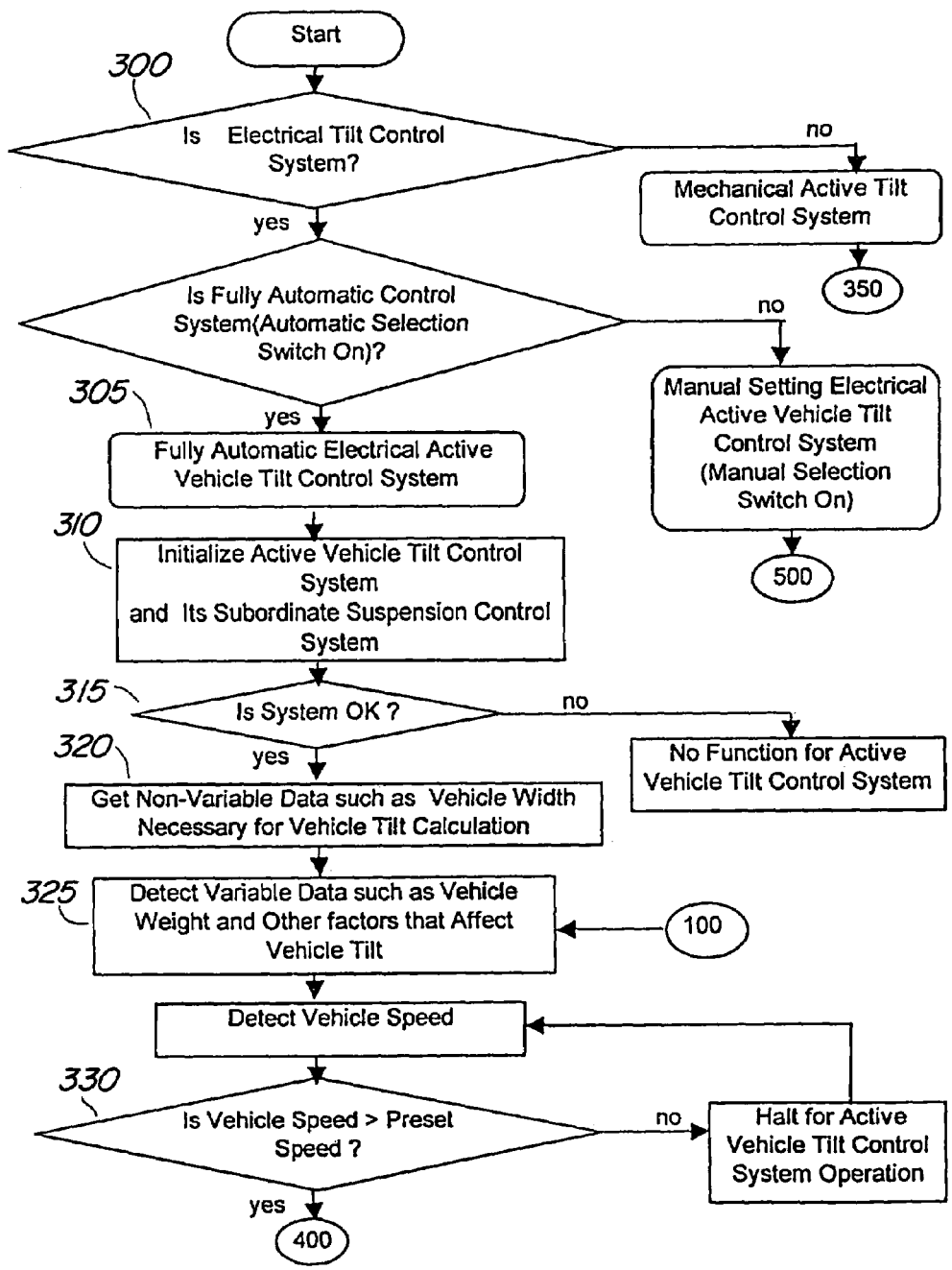
FIGS. 11 A, B, C and D is a logic diagram of steps used to perform operations of the preferred embodiment of the present invention.
Figure 11B:
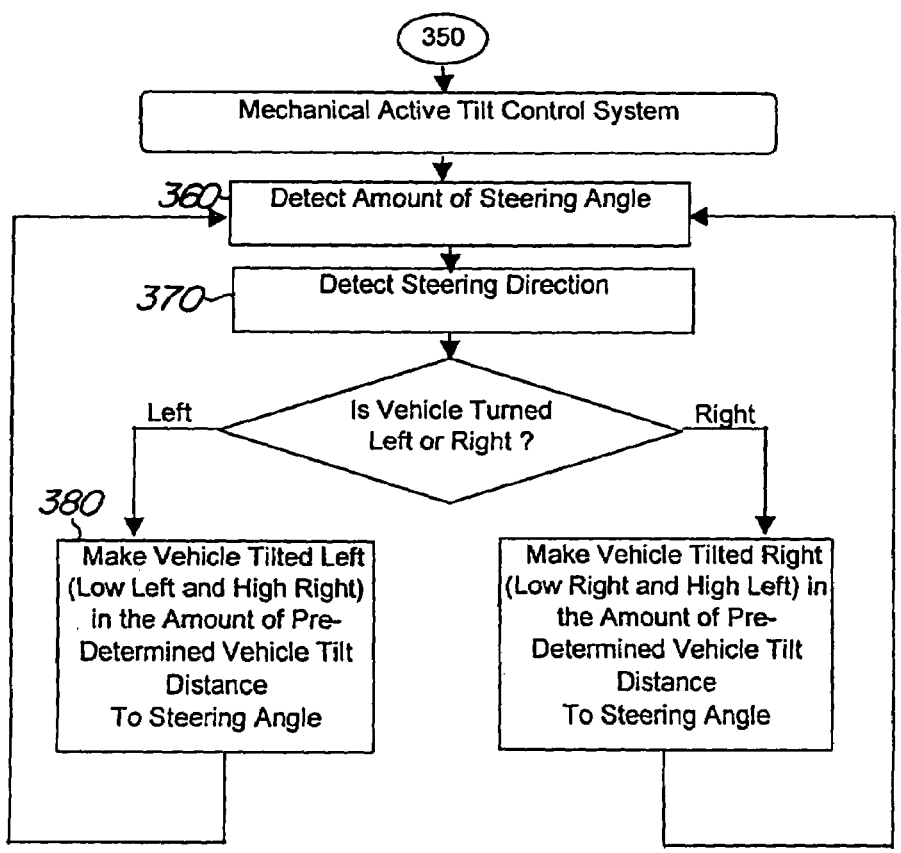
Figure 11D:
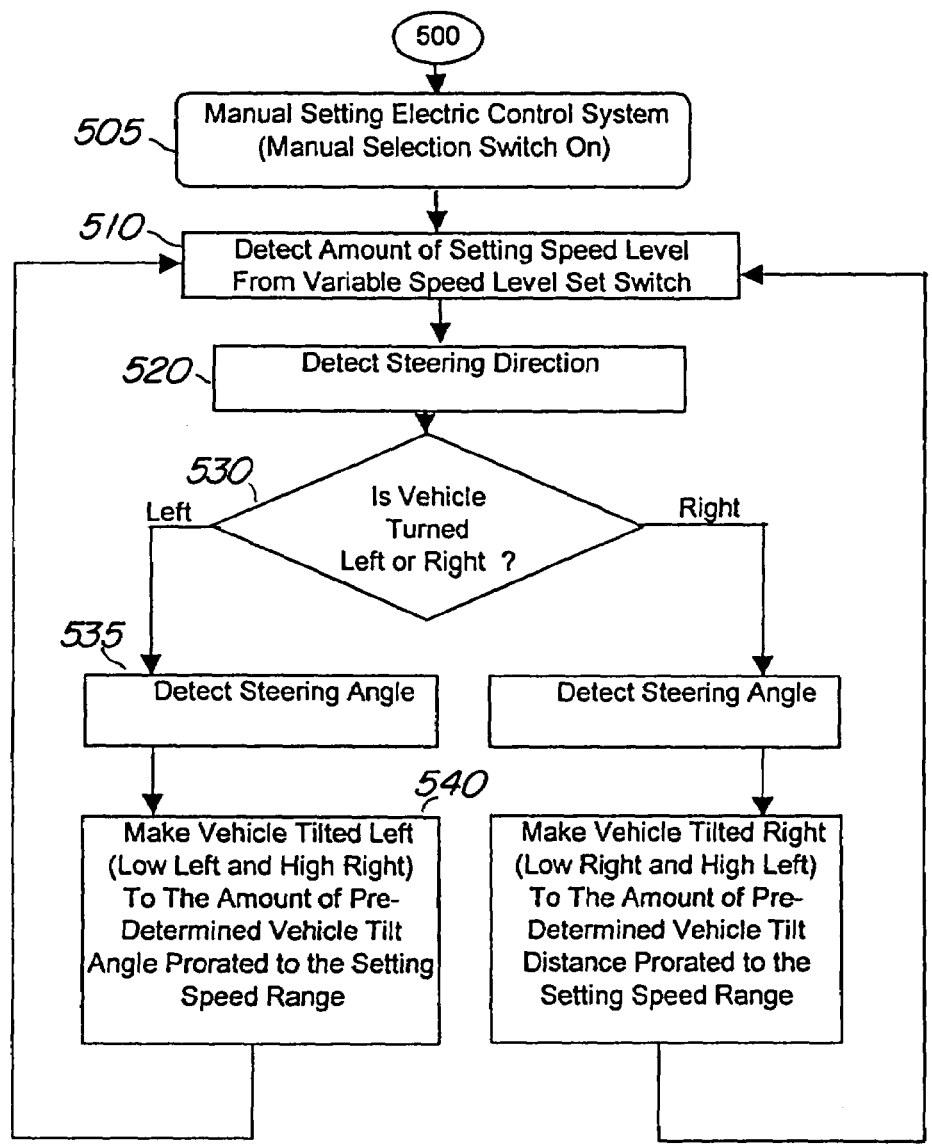

FIGS. 11 A, B, C and D illustrates a flow chart for the logic to control the tilt control mechanisms on the vehicle. The first box 300 reflects the decision as to whether the system will operate under the electrical control system or the non-electrical control system. If the answer is non-electrical, the system transfers to the mechanical control system denoted 350. If the answer is yes, then the active tilt control system is divided into two electrical control systems: fully automatic electrical active vehicle tilt control system 305 and manual setting electrical active vehicle tilt control system 500. If the selection is fully automatic electrical control system, the active vehicle tilt control system and its subordinate suspension control system will be initialized and the evaluations are made to determine whether all the systems are operational 315. If the systems are active and operating correctly, then the first operation 320 is to get non-variable data such as vehicle width necessary for vehicle tilt calculation. The vehicle weight and the other variable data 325 that affect vehicle tilt system can be detected by sensors or fetched from stored memory. The system retrieves all these variable as well as non-variable data and the information is provided to the central processing unit. The vehicle's speed is shared by the vehicle's speed sensor, and relayed to the tilt control central processing unit.

A determination 330 is then made as to whether the vehicle is in motion. If the vehicle is in motion then the speed of the vehicle is determined from the speed sensor and communicated to the central processing unit. If the speed is below a predetermined low speed—the speed that is not significant to use the active vehicle tilt system, then the active vehicle tilt control system can be disabled until the predetermined speed has been exceeded. If the predetermined speed has been exceeded, then the automatic active vehicle tilt control system is set to on (step 400).

The next step 410 is detecting steering angle to determine whether the steering wheel has been rotated enough to be practical for active tilting. This step will then eliminate idle rotation of steering wheel. If the steering wheel has been rotated by greater than a preset angle, the system detects the steering angle to get the present turning radius (step 420). From the turning radius, the system computes a tilt adjustment to overcome the natural tilt condition (step 430). Further the system determines whether the vehicle is turning left or right (step 440), and applies the offset to the respective vehicle side in response to the determination of the left or right turn 450. Once the vehicle tilt has been applied then the current vehicle tilt condition is measured (step 460) to determine whether the system has been returned to a stable mode or whether the system is still unstable. If the system is still unstable then the system returns to the current tilt condition and a correction factor (step 470) is calculated and applied to the vehicle (step 480). If the determined vehicle tilt distance is greater than the vehicle's tilt limit, then the tilting motion halts (step 490). After all these steps are completed, the system returns to step 325 for continuous tilt operation.

In the mechanical control tilting portion of the logic, the first evaluation is to detect the amount of the steering angle from the steering wheel (step 360). From the steering angle and the steering direction (step 370) a mechanical tilt is applied to the vehicle in a predetermined manner depending on the two input conditions, taking into consideration other known factors such as weight, center of gravity, height, etc. (step 380).

In the manual setting electrical control system, the manual selection switch must be on to be initiated (step 505). The central processing unit then detects the setting speed level from a variable speed level set switch to determine a certain range of speed for the active tilt system operation (step 510). The steering direction is detected from the steering wheel (step 520) for the system to engage the active tilting to left or right side (step 530), and then steering angle detection (step 535). The active vehicle tilt system makes the vehicle tilt according to the amount of predetermined vehicle tilting angle prorated to the setting speed range (step 540). If the active tilting is applied to the vehicle, it goes back to beginning stage (step 510) for continuous operation.

Those in the art will appreciate that various adaptations and modifications of the just described preferred embodiments can be configured without departing from the scope and spirit of the invention. Therefore, it is to be understood that within the scope of the appended claims the invention maybe practiced other than as specifically described herein.

What is claimed is:

1. A vehicle stability control system that does active tilt as a counter measure of natural tilt comprising:
   a tilt control processing unit;
   a plurality of sensors for determining and communicating vehicle conditions to the tilt control processing unit;
   a lifting mechanism for lifting a designated side of the vehicle in response to a judging by the tilt control processing unit that an active tilt condition is necessary; and
   a mechanism for shifting a ballast or any heavy part of the vehicle from a neutral position to a laterally biased position based on a judging by the tilt control processing unit that an active tilt condition is necessary.

2. The vehicle control system of claim 1 wherein at least one sensor measures the velocity of the vehicle.

3. The vehicle control system of claim 2 wherein at least one sensor measures the instantaneous turning radius of the vehicle during a turning maneuver.

4. The vehicle control system of claim 3 wherein the tilt control processing unit also factors into the judging the location of the center of gravity of the vehicle.

5. The vehicle control system of claim 3 wherein at least one sensor measures the force generated by a crosswind on the vehicle.

6. The vehicle control system of claim 3 wherein at least one sensor measures current vehicle tilt status.

7. The vehicle control system of claim 1 wherein the lifting mechanism comprises a vehicle suspension system and controller, and a secondary suspension support unit and controller.

8. A vehicle stability system comprising:
   a plurality of sensors for determining and communicating vehicle conditions;
   a processing unit communicatively coupled to the plurality of sensors, the processing unit configured to:
   determine when a vehicle is turning;
   determining a natural tilt force of the vehicle as it is turning;
   generating an output signal that causes a designated side of the vehicle to either lift or lower; and
   a mechanism for shifting a ballast or any heavy part of the vehicle from a neutral position to a laterally biased position.

9. The vehicle stability system of claim 8 further comprising:
   a lifting mechanism for lifting the designated side of the vehicle in response to the output signal from the processing unit.

10. The vehicle stability system of claim 8 wherein the natural tilt force vector of the vehicle is determined from a centrifugal force for the vehicle and weight gravity force for the vehicle.

11. The vehicle stability system of claim 8 wherein the processing unit is further configured to:
    determine a turning direction of the vehicle,
    determine an absolute natural tilt angle formed between the natural tilt force vector and a vector corresponding to the weight gravity force for the vehicle, and
    determine an ideal tilting angle so that, when the vehicle is at a dynamic stable state, the natural tilt force vector is at approximately ninety degrees with the horizontal line of the vehicle, wherein the output signal causes the vehicle to be placed at the ideal tilting angle and in the dynamic stable state less lateral force is perceived within the vehicle than in a static stable state.

* * * * *